United States Patent
Hsu et al.

(10) Patent No.: US 10,201,045 B1
(45) Date of Patent: Feb. 5, 2019

(54) LIGHT-EMITTING DIODE LIGHTING DEVICE

(71) Applicant: IML International, Grand Cayman (KY)

(72) Inventors: Horng-Bin Hsu, Taipei (TW); Yi-Mei Li, New Taipei (TW); Yung-Hsin Chiang, New Taipei (TW)

(73) Assignee: IML International, Grand Cayman (KY)

( * ) Notice: Subject to any disclaimer, the term of this patent is extended or adjusted under 35 U.S.C. 154(b) by 0 days.

(21) Appl. No.: 15/965,966

(22) Filed: Apr. 29, 2018

Related U.S. Application Data (60) Provisional application No. 62/576,091, filed on Oct. 24, 2017.

(51) Int. Cl.
*H05B 37/02* (2006.01)
*H05B 33/08* (2006.01)

(52) U.S. Cl.
CPC ..... *H05B 33/0806* (2013.01); *H05B 33/0842* (2013.01); *H05B 33/0884* (2013.01); *H05B 37/02* (2013.01)

(58) Field of Classification Search
CPC ............ H05B 33/0812; H05B 33/0815; H05B 33/0827; H05B 33/0845; H05B 33/0872
USPC .............................................. 315/185 R, 192
See application file for complete search history.

(56) References Cited

U.S. PATENT DOCUMENTS

| | | | | |
|---|---|---|---|---|
| 8,653,752 | B2* | 2/2014 | Sakuragi | H05B 33/083 |
| | | | | 315/185 R |
| 9,301,355 | B2* | 3/2016 | Zhao | H05B 33/0818 |
| 2012/0187845 | A1* | 7/2012 | Saes | H05B 33/0818 |
| | | | | 315/113 |
| 2015/0002045 | A1* | 1/2015 | Hwang | H05B 33/0824 |
| | | | | 315/291 |
| 2015/0282266 | A1* | 10/2015 | Hsing Chen | H05B 33/083 |
| | | | | 315/185 R |
| 2016/0381750 | A1* | 12/2016 | Bong | H05B 33/0845 |
| | | | | 315/201 |
| 2017/0019969 | A1* | 1/2017 | O'Neil | H05B 33/083 |

* cited by examiner

*Primary Examiner* — Tung X Le
(74) *Attorney, Agent, or Firm* — Winston Hsu (57) ABSTRACT

An LED lighting device includes at least two luminescent devices, two current sensing elements, and two current regulators. The first and second luminescent device are driven by a rectified AC voltage for providing light according to first current and second current, respectively. The first current sensing element provides a first feedback voltage associated with the first current and the second current sensing element provides a second feedback voltage associated with the second current. The first current regulator provides a first regulating current setting according to the first feedback voltage and a line voltage detection voltage associated with the rectified AC voltage, wherein the waveform of the first regulating current setting follows the waveform of the rectified AC voltage. The second current controller is coupled in parallel to the second luminescent device and provides a constant second regulating current setting according to the second feedback voltage.

9 Claims, 9 Drawing Sheets

LIGHT-EMITTING DIODE LIGHTING DEVICE

CROSS REFERENCE TO RELATED APPLICATIONS

This application claims the benefit of U.S. provisional application No. 62/576,091 filed on 2017 Oct. 24.

BACKGROUND OF THE INVENTION

1. Field of the Invention

The present invention is related to an LED lighting device having multiple driving stages, and more particularly, to an LED lighting device having multiple driving stages for improving current harmonic.

2. Description of the Prior Art

Compared to traditional incandescent bulbs, light-emitting diodes (LEDs) are advantageous in low power consumption, long lifetime, small size, no warm-up time, fast reaction speed, and the ability to be manufactured as small or array devices. In addition to outdoor displays, traffic signs, and liquid crystal display (LCD) for various electronic devices such as mobile phones, notebook computers or personal digital assistants (PDAs), LEDs are also widely used as indoor/outdoor lighting devices in place of fluorescent of incandescent lamps.

Increasing use of electronic devices in daily life has greatly increased the stress caused by harmonic currents on low-voltage alternating-current (AC) public mains networks. To maintain the quality of these networks, European Standard EN 61000-3-2 was created to set levels for harmonic currents injected by loads back on to the network. According to EN 61000-3-2, the maximum permissible harmonic current in lighting equipment is given as a percentage of the fundamental input current. An LED lighting device directly driven by a rectified AC voltage usually adopts a plurality of LEDs coupled in series in order to provide required luminance. In a conventional method for driving an LED lighting device, the LEDs may be light up in stages in order to increase the effective operational voltage range. However, there is a need to improve current harmonic of LED lighting devices.

SUMMARY OF THE INVENTION

The present invention provides an LED lighting device having multiple driving stages and including a first luminescent device driven by a rectified AC voltage and configured to provide light according to first current; a first current sensing element configured to provide a first feedback voltage associated with the first current; a first current regulator configured to provide a first regulating current setting according to the first feedback voltage and a line voltage detection voltage associated with the rectified AC voltage, wherein a waveform of the first regulating current setting follows a waveform of the rectified AC voltage; a second luminescent device coupled in series to the first luminescent device and configured to provide light according to second current; a second current sensing element configured to provide a second feedback voltage associated with the second current; and a second current controller coupled in parallel to the second luminescent device and configured to provide a constant second regulating current setting according to the second feedback voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
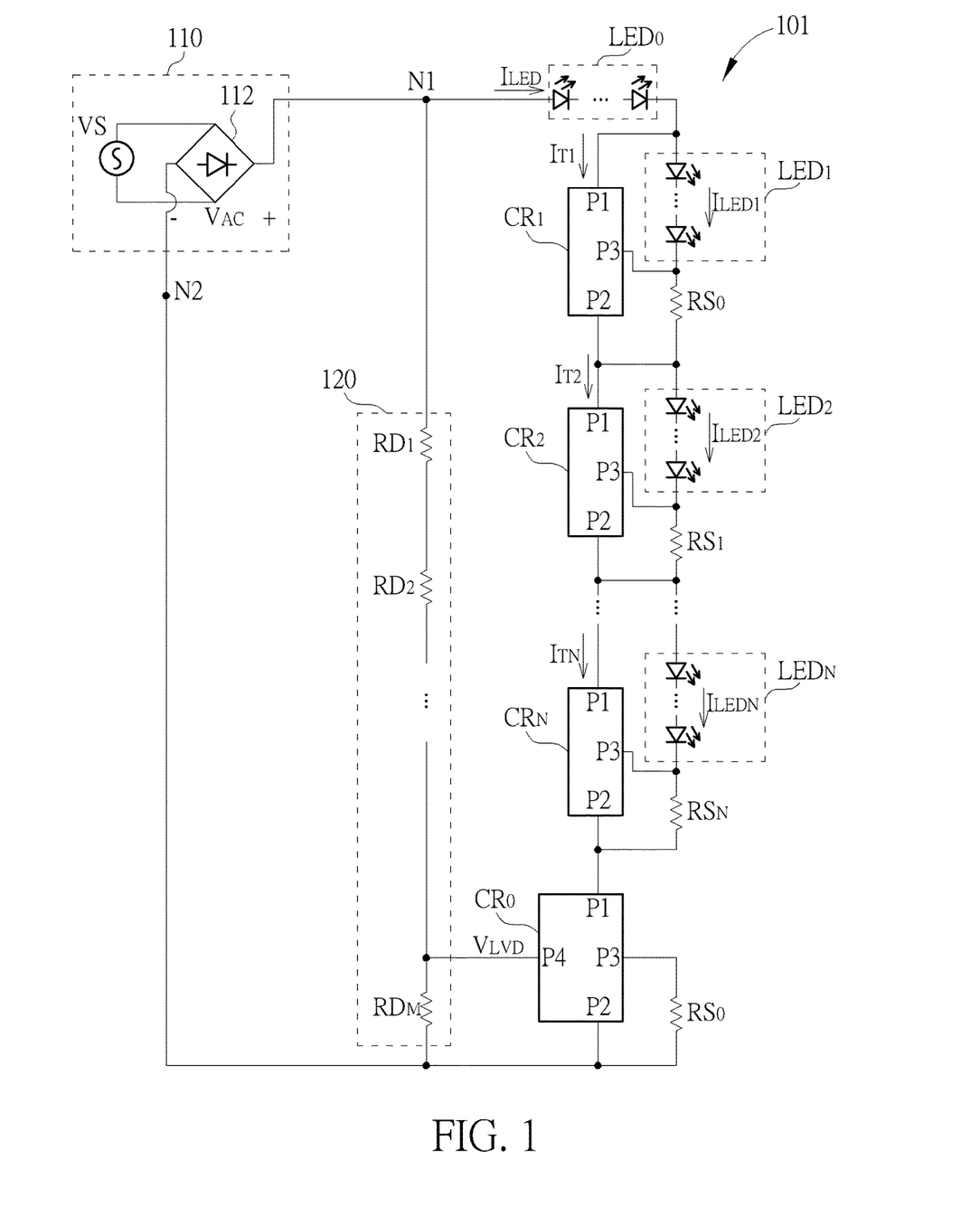
FIG. 1 is a diagram of an LED lighting device according to an embodiment of the present invention.
Figure 2:
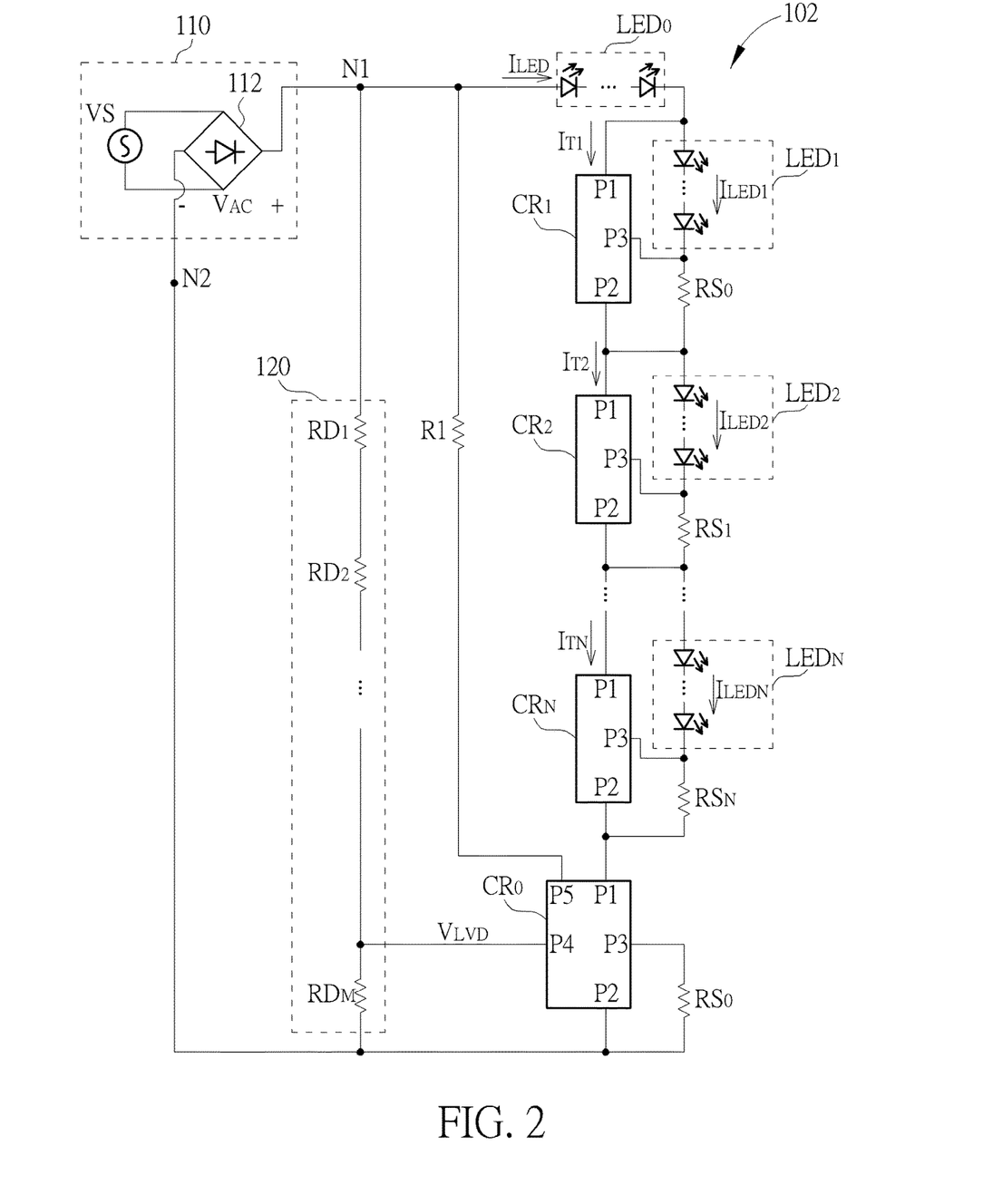
FIG. 2 is a diagram of an LED lighting device according to another embodiment of the present invention.
Figure 3:
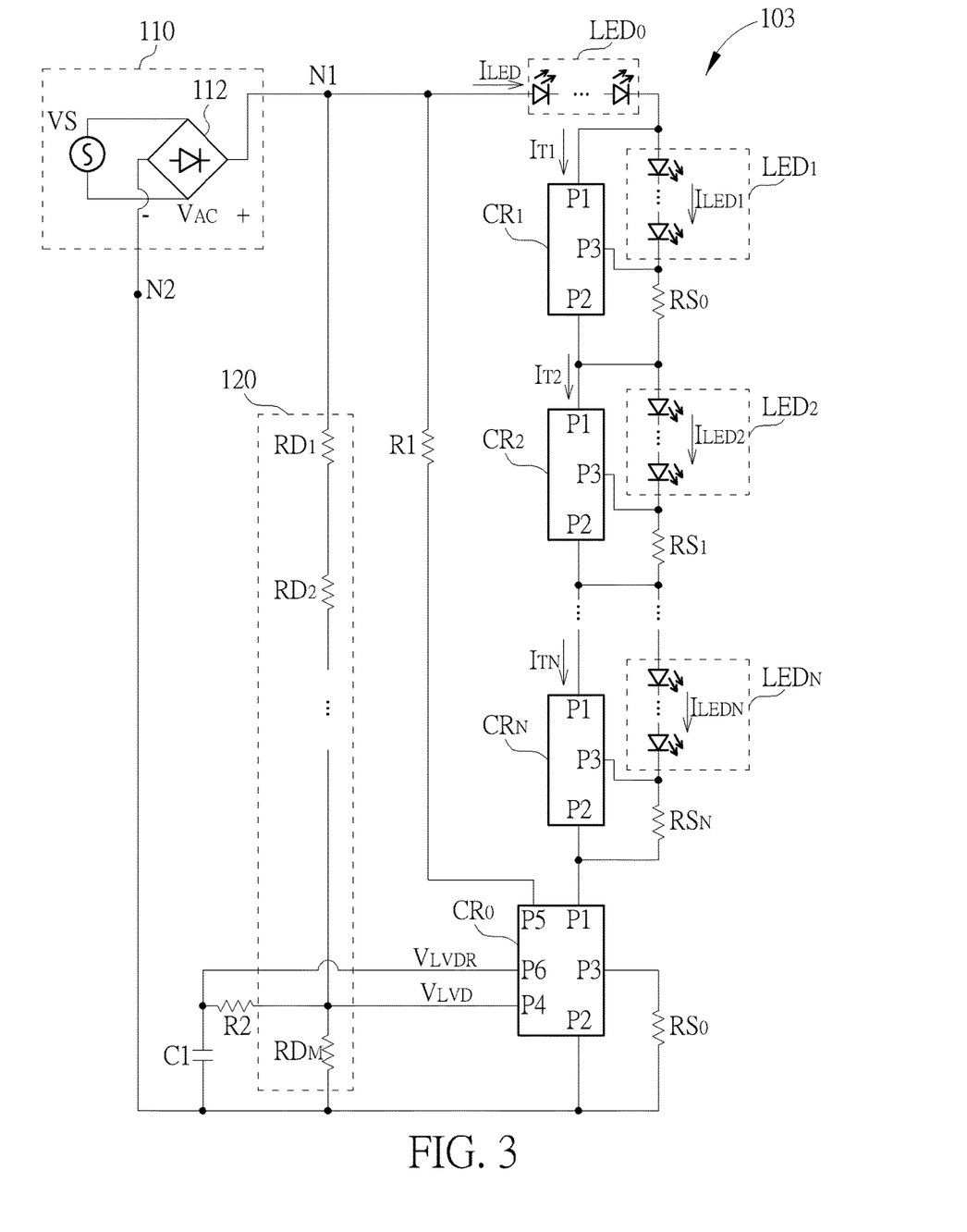
FIG. 3 is a diagram of an LED lighting device according to another embodiment of the present invention.

FIGS. 1~3 are diagrams of LED lighting devices 101~103 according to embodiments of the present invention. Each of the LED lighting devices 101~103 includes a power supply circuit 110, a voltage-dividing circuit 120, (N+1) luminescent device $LED_0$~$LED_N$, (N+1) current regulators $CR_0$~$CR_N$, (N+1) current sensing elements $RS_0$~$RS_N$ (N is a positive integer). The luminescent device $LED_0$~$LED_N$ are coupled in series. The current regulators $CR_0$~$CR_N$ are configured to regulate the current flowing through luminescent device $LED_0$~$LED_N$, respectively.

The power supply circuit 110 is configured to receive an AC voltage VS having positive and negative periods and convert the output of the AC voltage VS in the negative period using a bridge rectifier 112, thereby providing a rectified AC voltage $V_{AC}$, whose value varies periodically with time, for driving the LED lighting devices 101~103. N1 represents the positive output end of the power supply circuit 110, while N2 represents the negative output end of the power supply circuit 110. In another embodiment, the power supply circuit 110 may receive any AC voltage VS, perform voltage conversion using an AC-AC converter, and rectify the converted AC voltage VS using the bridge rectifier 112, thereby providing the rectified AC voltage $V_{AC}$ whose value varies periodically with time. However, the configuration of the power supply circuit 110 does not limit the scope of the present invention.

The voltage-dividing circuit 120 includes multiple resistors $RD_1$~$RD_M$ (M is an integer larger than 1) coupled in series between the positive output end N1 and the negative output end N2 of the power supply circuit 110. The voltage-dividing circuit 120 is configured to provide a voltage $V_{LVD}$ which is associated with the level of the rectified AC voltage $V_{AC}$ to the current regulator $CR_0$. However, the structure of the voltage-dividing circuit 120 does not limit the scope of the present invention.

In the LED lighting devices 101~103, each of the luminescent devices $LED_0$~$LED_N$ may adopt a single LED or multiple LEDs coupled in series. FIGS. 1~3 depict the embodiment using multiple LEDs which may consist of single-junction LEDs, multi-junction high-voltage (HV) LEDs, or any combination of various types of LEDs. However, the types and configurations of the luminescent devices $LED_0$~$LED_N$ do not limit the scope of the present invention.

In the LED lighting devices 101~103, each of the current sensing elements $RS_0$~$RS_N$ may adopt a resistor or another device providing similar function. However, the type of the current sensing elements does not limit the scope of the present invention.

For illustrative purposes, the following symbols are used to explain the operation of the LED lighting devices 101~103 throughout the description and figures. $I_{LED1}$~$I_{LEDN}$ represent the current flowing through the luminescent devices $LED_1$~$LED_N$. $I_{LED}$ represents the current flowing through the luminescent device $LED_0$, which is also the overall current flowing through the LED lighting devices 101~103. $I_{T1}$~$I_{TN}$ represent the current drained by the current regulators $CR_1$~$CR_N$, respectively.

Figure 4:
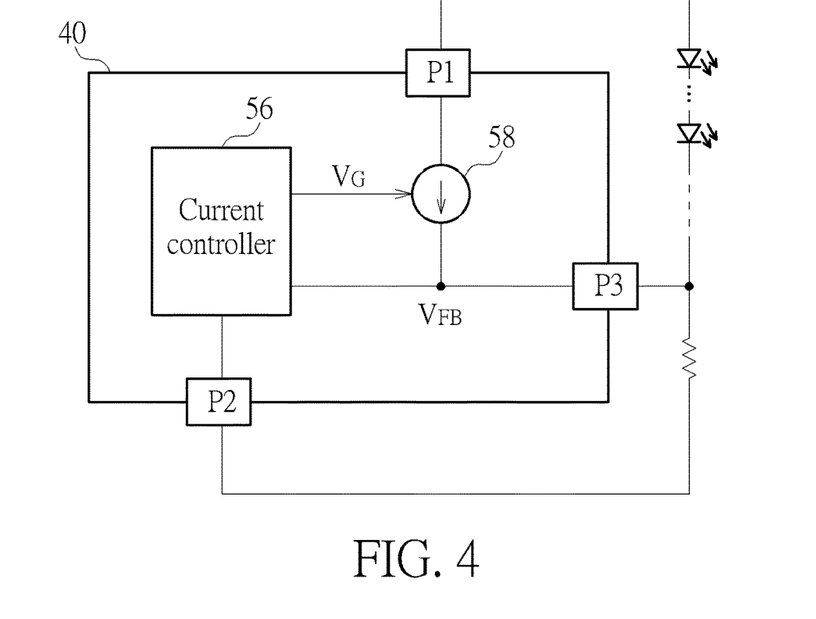
FIG. 4 is a diagram illustrating a current regulator block for implementing a current regulator in the LED lighting device according to an embodiment of the present invention.

FIG. 4 is a diagram illustrating a current regulator block 40 for implementing the current regulators $CR_1$~$CR_N$ in the LED lighting devices 101~103 according to an embodiment of the present invention. The current regulator block 40 includes a current controller 56 and a controllable current source 58. The current regulator block 40 may be fabricated in the same chip as a three-pin device, wherein Pin P1 is an input pin which is coupled to a first end of the corresponding luminance device, Pin P2 is a ground pin which is coupled to Pin P1 of a first end of a corresponding subsequent-stage current regulator, and Pin P3 is a control pin which is coupled to a second end of the corresponding luminance device. The current sensing elements $RS_1$~$RS_N$ are coupled between Pin P2 and Pin P3 of the corresponding current regulator blocks 40 implementing the current regulators $CR_1$~$CR_N$, respectively. The controllable current sources 58 in the current regulator blocks 40 implementing the current regulators $CR_1$~$CR_N$ are configured to generate regulating current $I_{T1}$~$I_{TN}$ for the luminescent devices $LED_1$~$LED_N$, respectively. The current-sensing elements $RS_1$~$RS_N$ are configured to monitor the current $I_{LED1}$~$I_{LEDN}$ flowing through the luminescent devices $LED_1$~$LED_N$, thereby providing feedback voltages $V_{FB}$ to the current controller 56 via Pin P3. The current controllers 56 in the current regulator blocks 40 implementing the current regulators $CR_1$~$CR_N$ are configured to generating control signals $V_G$ to operate the corresponding controllable current sources 58 according to feedback voltages $V_{FB}$ provided by the current-sensing elements $RS_1$~$RS_N$, respectively. The controllable current sources 58 in the current regulator blocks 40 implementing the current regulators $CR_1$~$CR_N$ are configured to generate constant regulating current $I_{T1}$~$I_{TN}$ respectively for the luminescent devices $LED_1$~$LED_N$ according to the current $I_{LED1}$~$I_{LEDN}$ flowing through the luminescent devices $LED_1$~$LED_N$, at respective constant levels. More specifically, if the current flowing through a luminescent device is too large, the corresponding current controller 56 is configured to operate corresponding controllable current source 58 to increase its regulating current for shunting more current, thereby maintaining the sum of the current flowing through the luminescent device and the current flowing through the controllable current source 58 at a constant value; if the current flowing through a luminescent device is too small, the corresponding current controller 56 is configured to operate corresponding controllable current source 58 to decrease its regulating current for shunting less current, thereby maintaining the sum of the current flowing through the luminescent device and the current flowing through the controllable current source 58 at a constant value.

Figure 5:
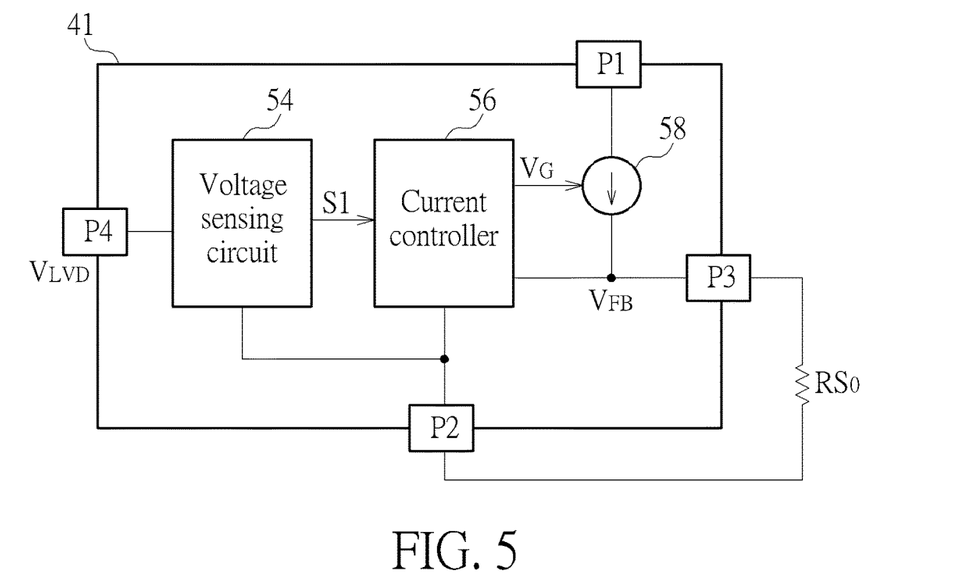
FIG. 5 is a diagram illustrating a current regulator block for implementing a current regulator in the LED lighting device of FIG. 1 according to an embodiment of the present invention.

FIG. 5 is a diagram illustrating a current regulator block 41 for implementing the current regulator $CR_0$ in the LED lighting device 101 according to an embodiment of the present invention. The current regulator block 41 includes a voltage sensing circuit 54, a current controller 56, and a controllable current source 58. The current regulator block 41 implementing the current regulator $CR_0$ in the LED lighting device 101 may be fabricated in the same chip as a four-pin device, wherein Pin P1 is an input pin which is coupled in series to the luminance devices $LED_1$~$LED_N$, Pin P2 is a ground pin coupled to the negative output end N2 of the power supply circuit 110, Pin P3 is a control pin, and Pin P4 is a line voltage detection pin which is coupled between two adjacent resistors in the voltage-dividing circuit 120 for monitoring the status of the power supply circuit 110 based on the voltage $V_{LVD}$ which is associated with the level of the rectified AC voltage $V_{AC}$. The current sense element $RS_0$, coupled between Pin P2 and Pin P3 of the current regulator block 41 implementing the current regulator block 41 in the LED lighting device 101, is configured to provide a feedback voltages $V_{FB}$ associated the current level of the current $I_{LED}$. The voltage sensing circuit 54 is configured to generate a control signal S1 for the current controller 56 according to the voltage $V_{LVD}$ from Pin P4. The current controller 56 of the current regulator block 41 implementing the current regulator $CR_0$ is configured to generate a control signal $V_G$ to operate the controllable current source 58 according to the control signal S1 and the feedback voltage $V_{FB}$ from Pin P3 so that the controllable current source 58 may regulate the current $I_{LED}$ to have a waveform which follows the waveform of the voltage $V_{LVD}$ in order to improve current harmonic.

Figure 6:
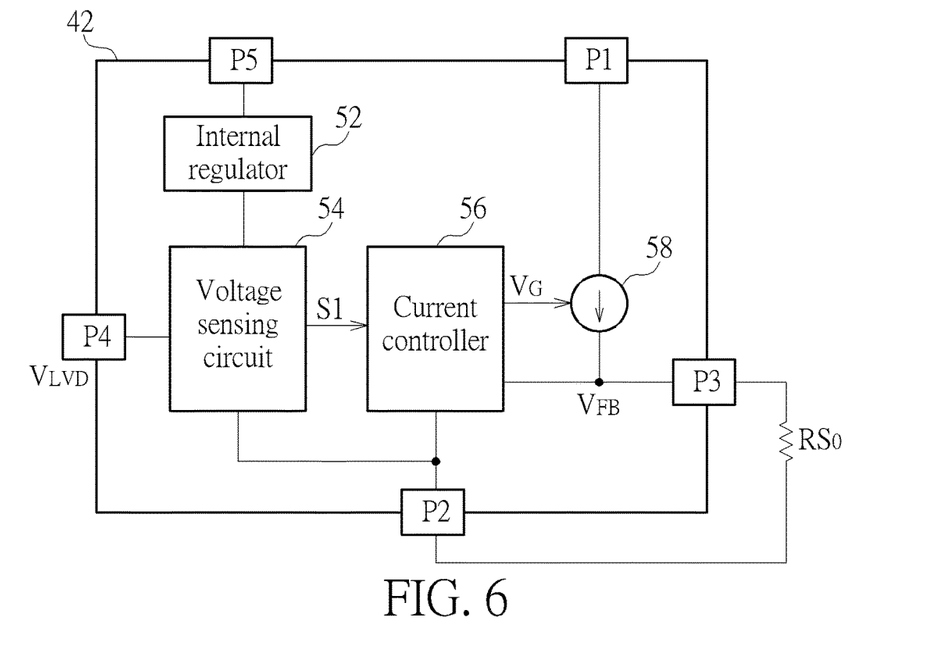
FIG. 6 is a diagram illustrating a current regulator block for implementing a current regulator in the LED lighting device of FIG. 2 according to an embodiment of the present invention.

FIG. 6 is a diagram illustrating a current regulator block 42 for implementing the current regulators $CR_0$ in the LED lighting device 102 according to an embodiment of the present invention. The current regulator block 42 implementing the current regulator $CR_0$ in the LED lighting device 102 includes an internal regulator 52, a voltage sensing circuit 54, a current controller 56, and a controllable current source 58. The current regulator block 42 implementing the current regulator $CR_0$ in the LED lighting device 102 may be fabricated in the same chip as a five-pin device, wherein Pin P1 is an input pin which is coupled in series to the luminance devices $LED_1$~$LED_N$, Pin P2 is a ground pin coupled to the negative output end N2 of the power supply circuit 110, Pin P3 is a control pin, Pin P4 is a line voltage detection pin which is coupled between two adjacent resistors in the voltage-dividing circuit 120, and Pin P5 is a power pin coupled to the positive output end of the power supply 110 via a resistor R1. The current sense element $RS_0$, coupled between Pin P2 and Pin P3 of the current regulator block 42 implementing the current regulators $CR_0$ in the LED lighting device 102, is configured to provide a feedback voltages $V_{FB}$ associated the current level of the current $I_{LED}$. With the voltage-dividing circuit 120, the current regulator block 42 implementing the current regulator $CR_0$ in the LED lighting device 102 may monitor the status of the power supply circuit 110 according to the voltage $V_{LVD}$ established at Pin P4 which is associated with the level of the rectified AC voltage $V_{AC}$. The voltage sensing circuit 54 is configured to generate the control signal S1 for the current controller 56 according to the voltage $V_{LVD}$ from Pin P4. The current controller 56 of the current regulator block 42 implementing the current regulator $CR_0$ in the LED lighting device 102 is configured to generate a control signal $V_G$ to operate the controllable current source 58 according to the control signal S1 and the feedback voltage $V_{FB}$ from Pin P3 so that the controllable current source 58 may regulate the current $I_{LED}$ to have a waveform which follows the waveform of the voltage $V_{LVD}$ in order to improve current harmonic. Pin P5 may supply the power through the internal regulator 52 in order to lower the drop-out voltage of Pin P1.

Figure 7:
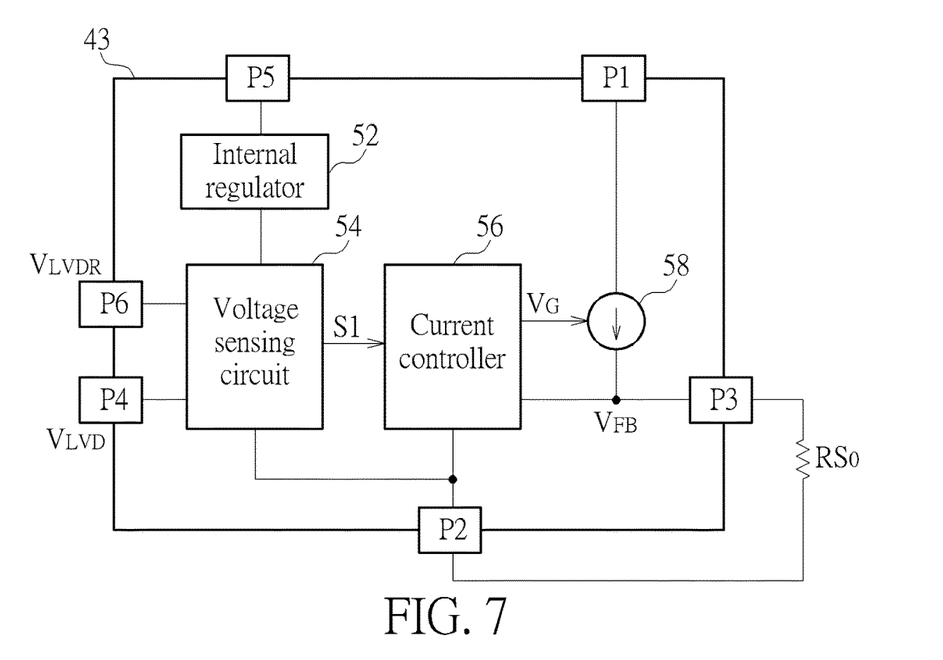
FIG. 7 is a diagram illustrating a current regulator block for implementing a current regulator in the LED lighting device of FIG. 3 according to an embodiment of the present invention.

FIG. 7 is a diagram illustrating a current regulator block 43 for implementing the current regulator $CR_0$ in the LED lighting device 103 according to an embodiment of the present invention. The current regulator block 43 implementing the current regulator $CR_0$ in the LED lighting device 103 includes an internal regulator 52, a voltage sensing circuit 54, a current controller 56, and a controllable current source 58. The current regulator block 43 implementing the current regulator $CR_0$ in the LED lighting device 103 may be fabricated in the same chip as a six-pin device, wherein Pin P1 is an input pin which is coupled in series to the luminance devices $LED_1$~$LED_N$, Pin P2 is a ground pin coupled to the negative output end N2 of the power supply circuit 110, Pin P3 is a control pin, Pin P4 is a line voltage detection pin which is coupled between two adjacent resistors in the voltage-dividing circuit 120, and coupled to the negative output end N2 of the power supply 110 via a resistor R2 and a capacitor C1 for acquiring a root mean square (RMS) of the rectified AC voltage $V_{AC}$, Pin P5 is a power pin coupled to the positive output end of the power supply 110 via a resistor R1, and Pin P6 is a line voltage detection in RMS coupled to receive the RMS of the rectified AC voltage $V_{AC}$ from Pin P4. The current sense element $RS_0$, coupled between Pin P2 and Pin P3 of the current regulator block 43 implementing the current regulator $CR_0$ in the LED lighting device 103, is configured to provide a feedback voltage $V_{FB}$ associated the current level of the current $I_{LED}$. With the voltage-dividing circuit 120, the current regulator block 43 implementing the current regulator $CR_0$ in the LED lighting device 103 may monitor the status of the power supply circuit 110 according to a voltage $V_{LVD}$ established at Pin P4 which is associated with the level of the rectified AC voltage $V_{AC}$. The voltage sensing circuit 54 is configured to generate the control signal S1 for the current controller 56 according to the voltage $V_{LVD}$ from Pin P4 and the voltage $V_{LVDR}$ from Pin P6. The current controller 56 of the current regulator $CR_0$ is configured to generate a control voltages $V_G$ to operate the corresponding controllable current sources 58 according to the control signal S1 and the feedback voltage $V_{FB}$ from Pin P3 so that the corresponding controllable current sources 58 may generate regulating current $I_{T0}$ whose waveform follows the waveform of the voltage $V_{LVD}$ and the voltage $V_{LVD}$ in order to minimize current harmonic. Pin P5 may supply the power through the internal regulator 52 in order to lower the drop-out voltage of Pin P1. The current regulator $CR_0$ in the LED lighting device 103 may further detect the RMS value of the rectified Ac voltage $V_{AC}$ at Pin P6, thereby improving line regulation.

In the present invention, the controllable current source 58 may adopt a metal-oxide-semiconductor field-effect transistor (MOSFET), a bipolar junction transistor (BJT), or another device with similar function. However, the type of the controllable current source 58 does not limit the scope of the present invention.

Figure 8:
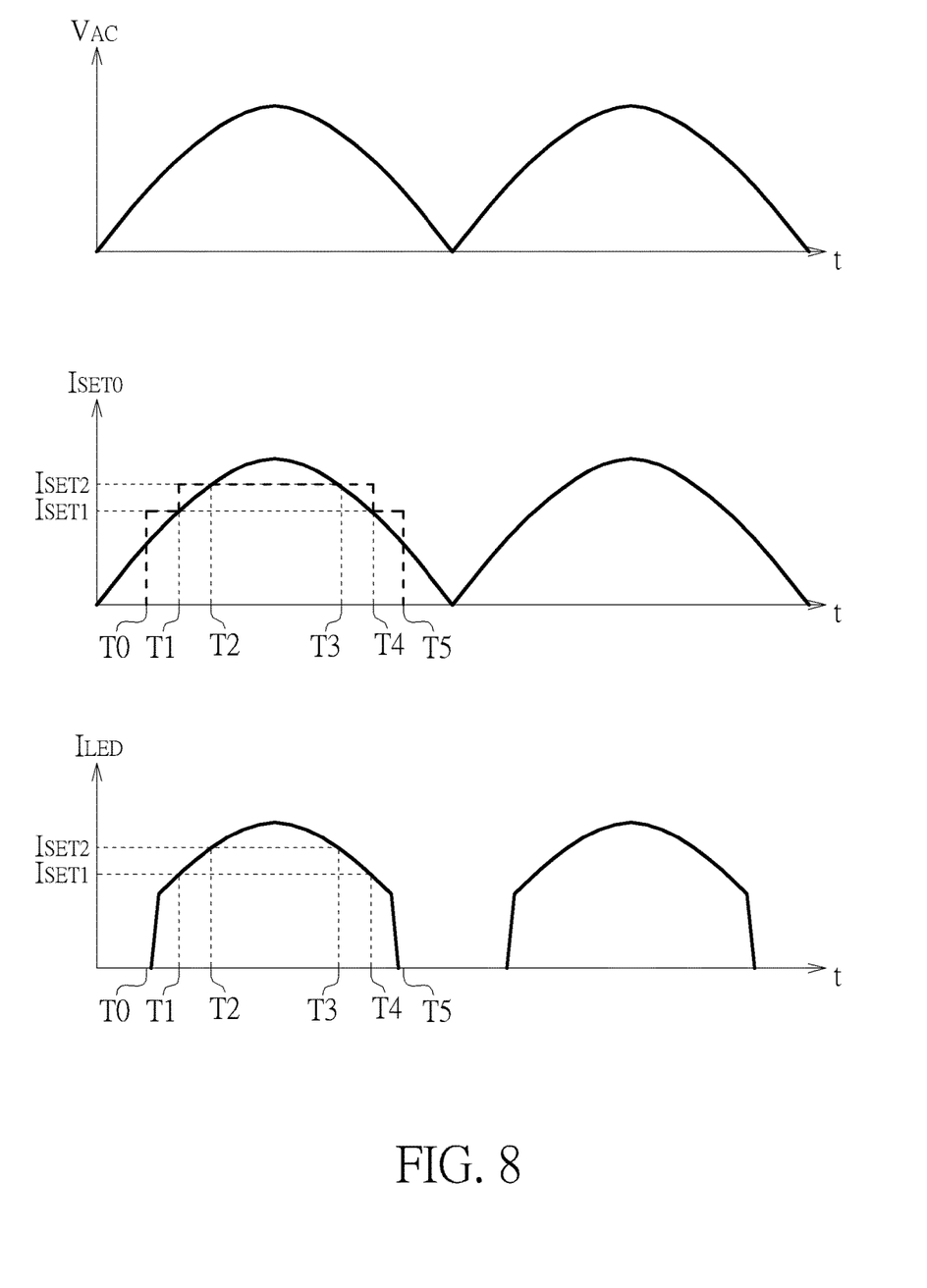
FIG. 8 is a diagram illustrating the current/voltage characteristics of the LED lighting devices in FIGS. 1-2 according to an embodiment of the present invention.
Figure 9:
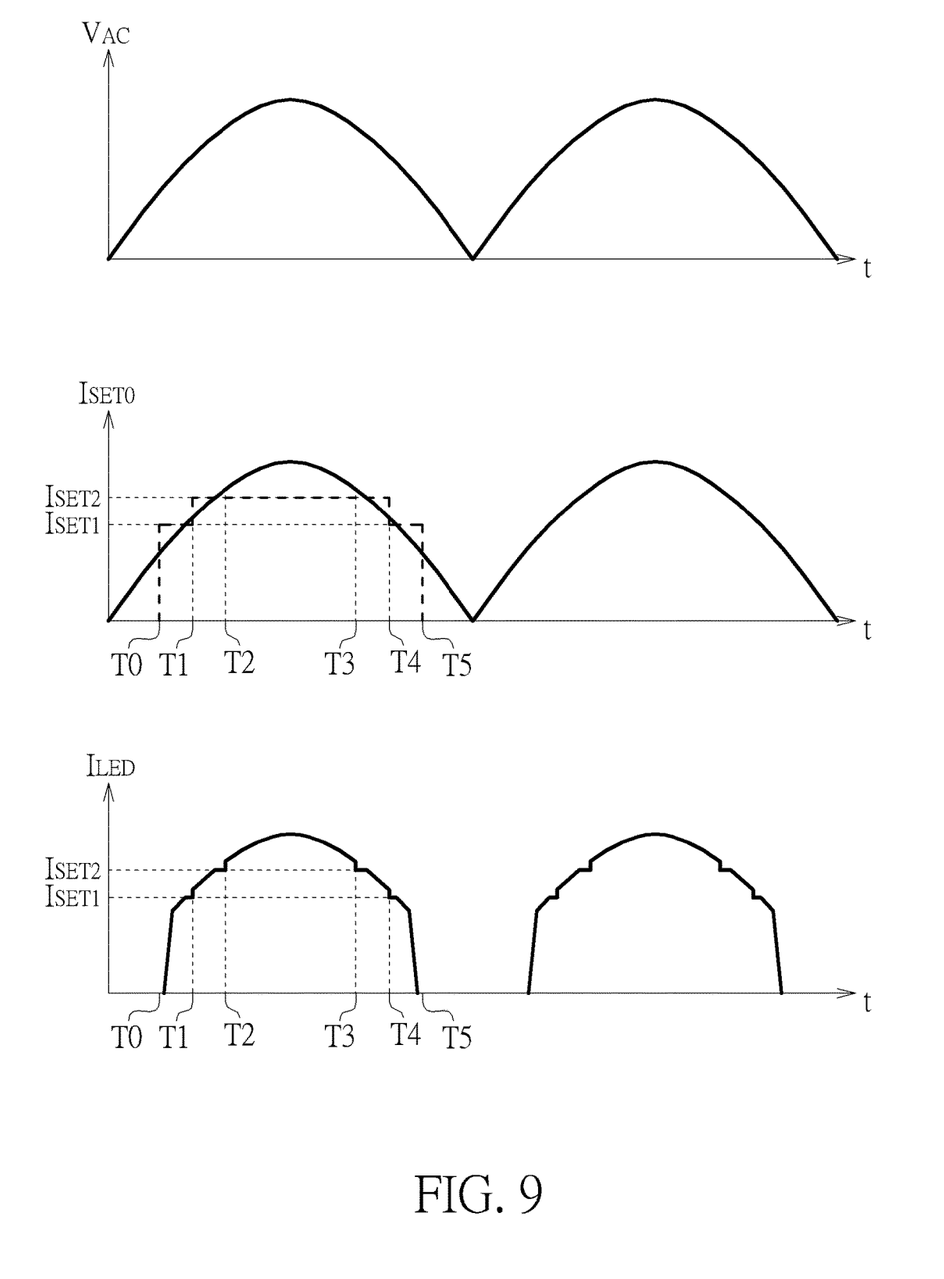
FIG. 9 is a diagram illustrating the current/voltage characteristics of the LED lighting devices in FIGS. 1-2 according to another embodiment of the present invention.

FIGS. 8 and 9 are diagrams illustrating the current/voltage characteristics of the LED lighting devices 101 and 102 according to the present invention. For illustrative purpose, FIGS. 8 and 9 depict the embodiment when N=2, wherein the current regulators $CR_1$ and $CR_2$ are implemented with the current regulator block 40 and the current regulators $CR_0$ is implemented with the current regulator block 41 or 42. The overall regulating current setting of the current $I_{LED}$ is controlled by the current regulators $CR_0$~$CR_2$, wherein the regulating current setting of the current regulator $CR_1$ is represented by $I_{SET1}$, the regulating current setting of the current regulator $CR_2$ is represented by $I_{SET2}$, and the regulating current setting of the current regulator $CR_0$ is represented by $I_{SET0}(t)$. As previously stated, the current regulators $CR_1$ and $CR_2$ are configured to provide constant regulating current settings $I_{SET1}$ and $I_{SET2}$, while the current regulator $CR_0$ is configured to provide the regulating current setting $I_{SET0}(t)$ which follows the waveform of the rectified AC voltage $V_{AC}$.

For illustrative purpose, T0~T5 represent different time points during a cycle of the rectified AC voltage $V_{AC}$. Before T0 and after T5, the rectified AC voltage is still insufficient to turn on the luminance device $LED_0$ and the current $I_{LED}$ is substantially zero. Between T0 and T1 and between T4 and T5, the value of the current $I_{LED}$ is limited by the smaller among the constant regulating current setting $I_{SET1}$ of the current regulator $CR_1$ and the time-varying regulating current setting $I_{SET0}(t)$ of the current regulator $CR_0$. Between T1 and T2 and between T3 and T4, the value of the current $I_{LED}$ is limited by the smaller among the constant regulating current setting $I_{SET2}$ of the current regulator $CR_2$ and the time-varying regulating current setting $I_{SET0}(t)$ of the current regulator $CR_0$. Between T2 and T3, the value of the current $I_{LED}$ is limited by the time-varying regulating current setting $I_{SET0}(t)$ of the current regulator $CR_0$.

In the embodiment illustrated in FIG. 8, Pin P4 of the current regulator $CR_0$ in the LED lighting devices 101 and 102 is coupled to the positive output end N1 of the power supply 110 via the voltage-dividing circuit 120 in a way so as to provide a lower regulating current setting $I_{SET0}(t)$. For example, the value of the regulating current setting $I_{SET0}(t)$ does not exceed the regulating current setting $I_{SET1}$ between T0 and T1 and does not exceed the regulating current setting $I_{SET2}$ between T1 and T2. Under such circumstance, the current $I_{LED}$ is regulated by the current regulator $CR_0$ during the cycle of the rectified AC voltage $V_{AC}$.

In the embodiment illustrated in FIG. 9, Pin P4 of the current regulator $CR_0$ in the LED lighting devices 101 and 102 is coupled to the positive output end N1 of the power supply 110 via the voltage-dividing circuit 120 in a way so as to provide a higher regulating current setting $I_{SET0}(t)$. For example, the value of the regulating current setting $I_{SET0}(t)$ exceeds the regulating current setting $I_{SET1}$ for a short period between T0 and T1 and between T4 and T5, and exceeds the regulating current setting $I_{SET2}$ for a short period before T2 and after T3. Under such circumstance, before T1 and after T4 in the cycle of the rectified AC voltage $V_{AC}$, the current $I_{LED}$ is first regulated by the current regulator $CR_1$ and then by the current regulator $CR_0$. Between T1 and T2 and between T3 and T4 in the cycle of the rectified AC voltage $V_{AC}$, the current $I_{LED}$ is first regulated by the current regulator $CR_0$ and then by the current regulator $CR_2$.

Figure 10:
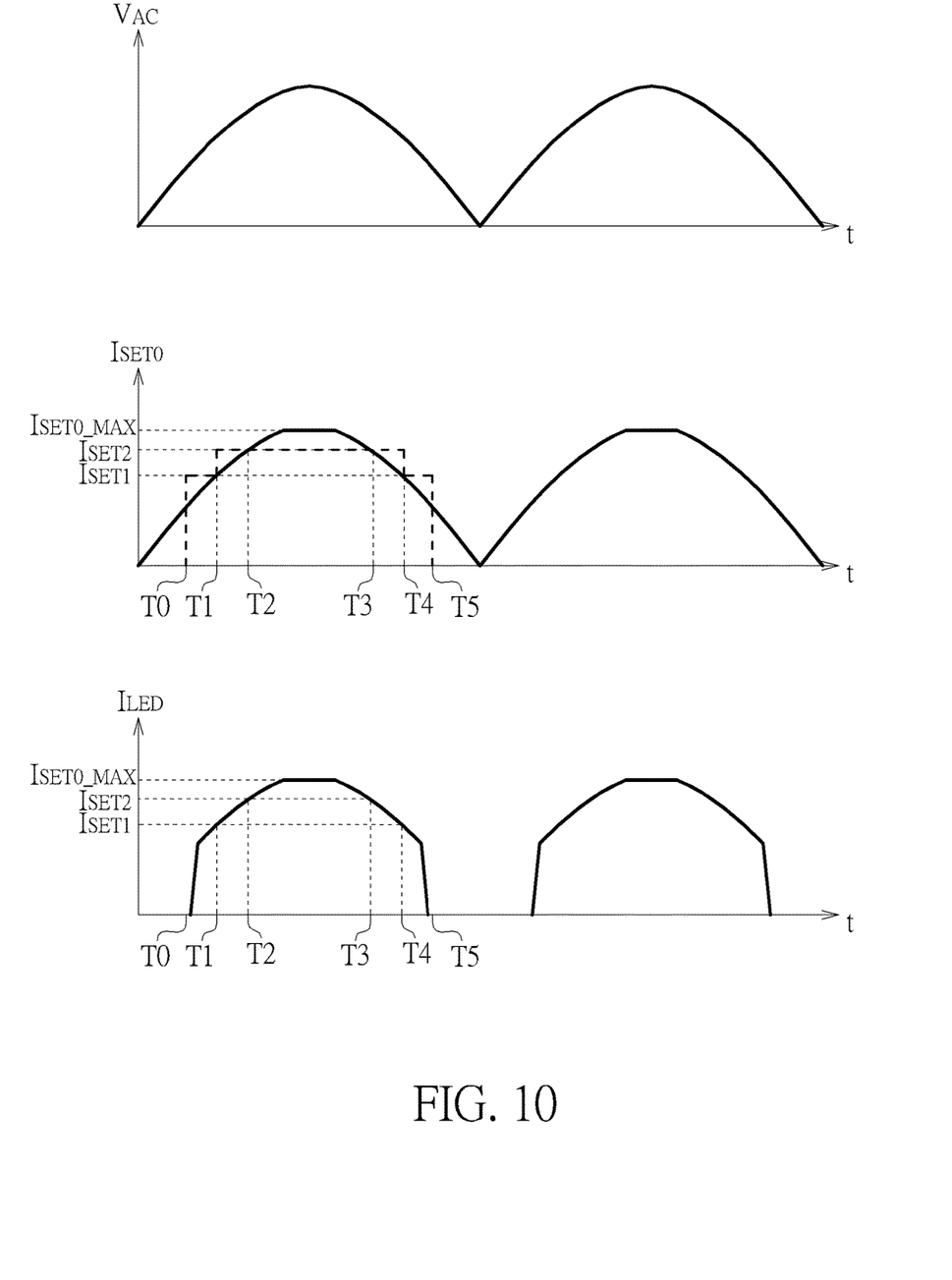
FIG. 10 is a diagram illustrating the current/voltage characteristics of the LED lighting device in FIG. 3 according to an embodiment of the present invention.
Figure 11:
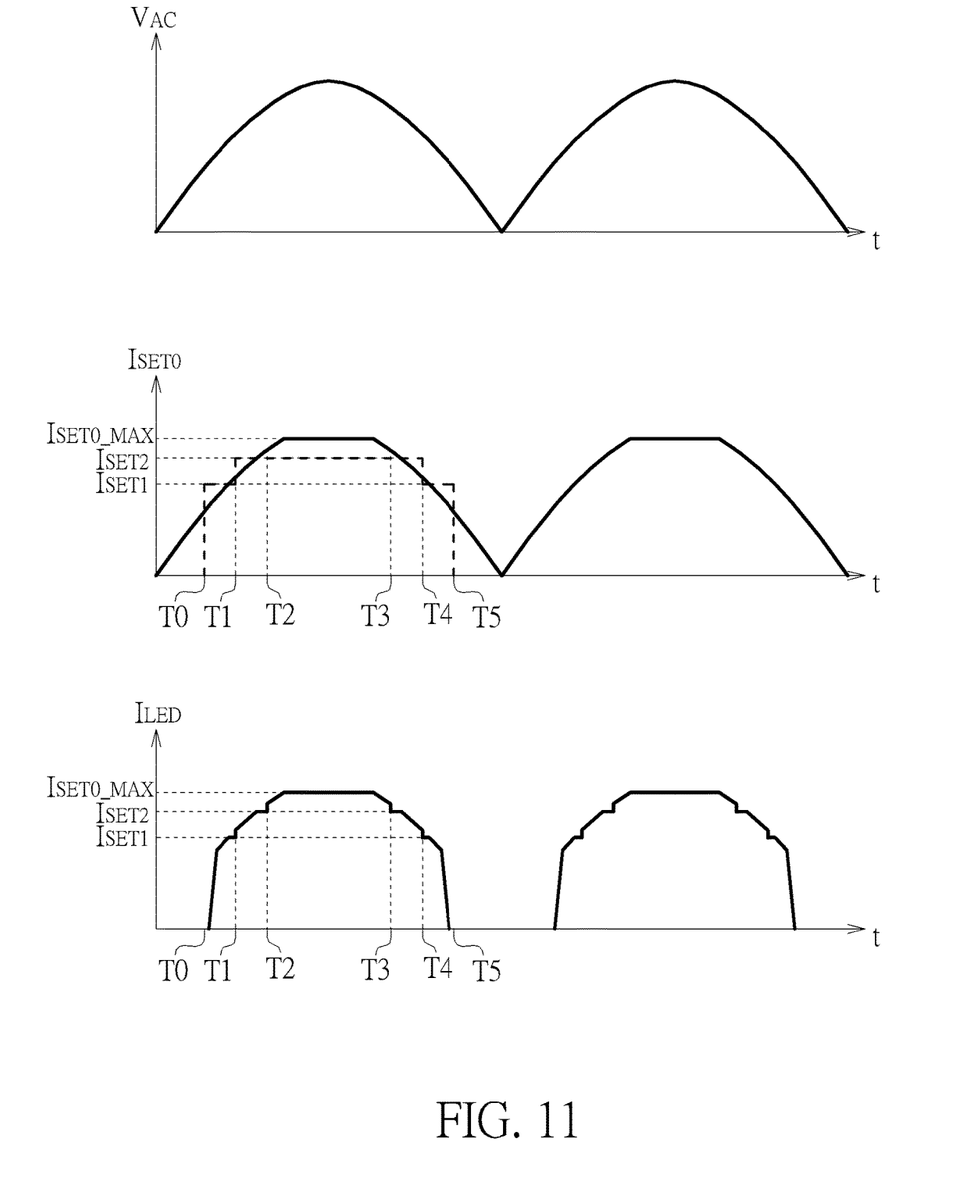
FIG. 11 is a diagram illustrating the current/voltage characteristics of the LED lighting device in FIG. 3 according to another embodiment of the present invention.

FIGS. 10 and 11 are diagrams illustrating the current/voltage characteristics of the LED lighting device 103 according to the present invention. For illustrative purpose, FIGS. 10 and 11 depict the embodiment when N=2, wherein the current regulators $CR_1$ and $CR_2$ are implemented with the current regulator block 40 and the current regulators $CR_0$ is implemented with the current regulator block 43. Similar to the operation of the LED lighting devices 101 and 102, the introduction of Pin P6 in the LED lighting device 103 provide a maximum regulating current $I_{SET0\_MAX}$ which is defined according to the level of Pin P6. When the level of Pin P6 become higher, which means the RMS value of the rectified AC voltage $V_{AC}$ is higher, the maximum regulating current $I_{SET0\_MAX}$ will become lower; when the level of Pin P6 become lower, which means the RMS value of the rectified AC voltage $V_{AC}$ is lower, the maximum regulating current $I_{SET0\_MAX}$ will become higher.

With the above-mentioned multi-stage driving scheme, the present invention may improve the effective operational voltage range and current harmonic of an LED lighting device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) lighting device having multiple driving stages, comprising:
    a first luminescent device driven by a rectified alternative-current (AC) voltage and configured to provide light according to a first current;
    a first current sensing element configured to provide a first feedback voltage associated with the first current;
    a first current regulator configured to provide a first regulating current setting according to the first feedback voltage and a line voltage detection voltage associated with the rectified AC voltage, wherein a waveform of the first regulating current setting follows a waveform of the rectified AC voltage, the first current regulator including:
        a first pin coupled in series to the first luminescent device;
        a second pin;
        a third pin coupled to receive the first feedback voltage;
        a fourth pin coupled to receive the line voltage detection voltage;
        a voltage sensing circuit coupled to the second pin and the fourth pin, and configured to generate a first control signal according to the line voltage detection voltage;
        a first current controller coupled to the second pin and the third pin, and configured to generate a second control signal according to the first control signal and the first feedback voltage; and
        a first controllable current source coupled to the first pin and the third pin, and configured to regulate the first current according to the second control signal so that the first current does not exceed a value of the first regulating current and the waveform of the first current follows a waveform of the line voltage detection voltage;
    a second luminescent device coupled in series to the first luminescent device and configured to provide light according to a second current;
    a second current sensing element configured to provide a second feedback voltage associated with the second current; and
    a second current regulator coupled in parallel to the second luminescent device and configured to provide a constant second regulating current setting according to the second feedback voltage.

2. The LED lighting device of claim 1, wherein the first current regulator further includes:
    a fifth pin coupled to the rectified AC voltage; and
    an internal regulator coupled to the fifth pin for supplying power to the first current regulator.

3. The LED lighting device of claim 1, wherein:
    the first current regulator further includes:
        a resistor;
        a capacitor;
        a fifth pin coupled to the rectified AC voltage;
        a sixth pin coupled to receive a root mean square (RMS) of the rectified AC voltage from the fourth pin;
        an internal regulator coupled to the fifth pin for supplying power to the first current regulator;
    the fourth pin is further coupled to the second pin via the resistor and the capacitor for acquiring the RMS of the rectified AC voltage; and
    the voltage sensing circuit is further coupled to the sixth pin and configured to generate the first control signal further according to a voltage established at the sixth pin.

4. The LED lighting device of claim 1, wherein the second current regulator includes:
    a fifth pin coupled to a first end of the second luminescent device;
    a sixth pin coupled to a first end of the second current sensing element;
    a seventh pin coupled between a second end of the second luminescent device and a second end of the second current sensing element for receiving the second feedback voltage;
    a second current controller coupled to the sixth pin and the seventh pin, and configured to generate a third control signal according to the second feedback voltage; and
    a second controllable current source coupled to the fifth pin and the seventh pin, and configured to regulate the second current according to the third control signal so that the second current does not exceeds the second regulating current setting.

5. The LED lighting device of claim 1, further comprising:
    a voltage-dividing circuit configured to generate the line voltage detection voltage by voltage-dividing the rectified AC voltage.

6. The LED lighting device of claim 1, further comprising:
    a third luminescent device coupled in series to the second luminescent device and configured to provide light according to a third current;
    a third current sensing element configured to provide a third feedback voltage associated with the third current; and a third current regulator coupled in parallel to the third luminescent device and configured to provide a constant third regulating current setting according to the third feedback voltage.

7. The LED lighting device of claim 1 further comprising a power supply circuit configured to provide the rectified AC voltage.

8. The LED lighting device of claim 1 wherein the first current sensing element and the second current sensing element are resistors.

9. A light-emitting diode (LED) lighting device having multiple driving stages, comprising:
- a first luminescent device driven by a rectified alternative-current (AC) voltage and configured to provide light according to a first current;
- a first current sensing element configured to provide a first feedback voltage associated with the first current;
- a first current regulator configured to provide a first regulating current setting according to the first feedback voltage and a line voltage detection voltage associated with the rectified AC voltage, wherein a waveform of the first regulating current setting follows a waveform of the rectified AC voltage;
- a second luminescent device coupled in series to the first luminescent device and configured to provide light according to second current;
- a second current sensing element configured to provide a second feedback voltage associated with the second current; and
- a second current regulator coupled in parallel to the second luminescent device and configured to provide a constant second regulating current setting according to the second feedback voltage, the second current regulator including:
  - a first pin coupled to a first end of the second luminescent device;
  - a second pin coupled to a first end of the second current sensing element;
  - a third pin coupled between a second end of the second luminescent device and a second end of the second current sensing element for receiving the second feedback voltage;
  - a current controller coupled to the second pin and the third pin, and configured to generate a control signal according to the second feedback voltage; and
  - a controllable current source coupled to the first pin and the third pin, and configured to regulate the second current according to the control signal so that the second current does not exceeds the second regulating current setting.

* * * * *